June 12, 1973 SYOZO TAKENO ET AL 3,738,865

METHOD FOR MANUFACTURING A MAGNETIC THIN FILM MEMORY ELEMENT

Filed July 30, 1970 2 Sheets-Sheet 1

June 12, 1973 SYOZO TAKENO ET AL 3,738,865

METHOD FOR MANUFACTURING A MAGNETIC THIN FILM MEMORY ELEMENT

Filed July 30, 1970 2 Sheets-Sheet 2

United States Patent Office 3,738,865

Patented June 12, 1973

3,738,865

METHOD FOR MANUFACTURING A MAGNETIC THIN FILM MEMORY ELEMENT

Syozo Takeno, Yokohama, Mitsuhiko Tashiro, Tokyo, and Akira Kasai, Yokohama, Japan, assignors to Tokyo Shibaura Electric Co., Ltd., Kawasaki-shi, Japan Filed July 30, 1970, Ser. No. 59,537
Claims priority, application Japan, July 31, 1969, 44/60,303
Int. Cl. B44d *1/18;* H01l *7/00*
U.S. Cl. 117—212 7 Claims

ABSTRACT OF THE DISCLOSURE

A magnetic thin film memory is formed by simultaneously etching a first magnetic thin film and a conductor film both successively integrated on a flat substrate as far as to the surface of the substrate thereby to form integrated strips comprised of equally spaced magnetic and conductive strips, selectively etching the conductive strips by an etchant capable of etching only the conductive strips in such a manner that their widths become less than the widths of the magnetic strips, and entirely covering, after removal of the photo-resist, each of the conductive strips with a magnetic thin film to form a closed flux path with said first magnetic thin film.

BACKGROUND OF THE INVENTION

This invention relates to a method for manufacturing a magnetic thin film memory element of a so-called closed type using a selective etching process.

A magnetic thin film element of the closed type in which each of a plurality of conductive strips or digit lines formed on a substrate is entirely covered with an independent magnetic thin film is employed, for example, as a memory device in an electronic computer. In the memory element of this nature, it is required that perfect closed magnetic paths are formed by the magnetic thin films around the conductive strips to obtain predetermined desired characteristics. The magnetic film is very thin and closely adhered on the conductive strip by a usual method, such as vapor deposition, so that the magnetic property of the magnetic thin film is greatly affected by the shape, particularly the smoothness, of the surface of the conductive strip.

A memory element of the type described is usually manufactured by successively integrating a first magnetic film and a conductive film on a flat substrate, simultaneously etching said both films by use of an etching mask of photo-resist to form integrated strips comprising equally spaced conductive and magnetic strips, and by depositing, after removal of said mask, a second magnetic film on the entire surfaces of each said conductive strip, except for the surface engaging the first magnetic strip. As a result, each conductive strip is covered by the first and second magnetic films. However, the magnetic coupling between the first and second magnetic films thus formed tends to be imperfect because of the fact that the conductive strip and the first and second magnetic films are very thin. This fails to form a perfect closed magnetic path around the conductive strip, with the result that such magnetic films are not suitable as memory elements.

Further, the etched both sides of the conductive strip cannot be formed flat and smooth by a known etching process, so that the second magnetic film to be deposited on such etched surface cannot be formed in uniform thickness, and in an extreme case, portions where magnetic coupling is broken are produced in the magnetic film, thus resulting in the formation of an imperfect closed magnetic path which lessens the properties of the magnetic film, such as, an increase of diamagnetic field and disorder in the direction of magnetic anisotropy.

SUMMARY OF THE INVENTION

The object of the invention is to provide a method for manufacturing a magnetic thin film memory element of the closed type, in which excellent magnetic coupling can be attained between first and second magnetic thin films by using a selective etching process using particular etchants. The etched surface of conductive strips is flat and smooth to enable a perfect closed magnetic path around the conductive strips to be formed with first and second magnetic thin films.

DETAILED DESCRIPTION OF THE INVENTION

Figure 1:
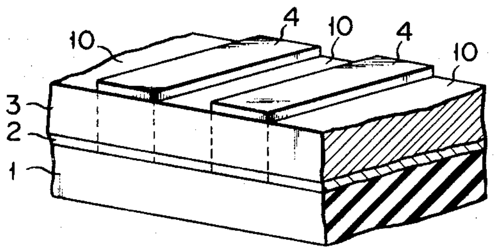
FIGS. 1 to 5 inclusive show a magnetic thin film memory element in different stages of fabrication to explain one embodiment of the method according to this invention.
Figure 2:
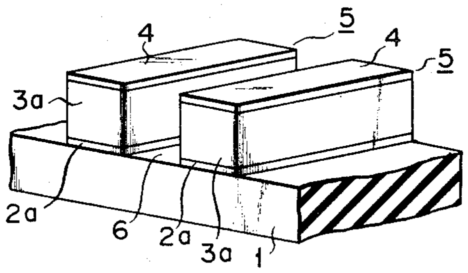

In FIG. 1, a magnetic material, such as permalloy, is vapor deposited or electroplated on the entire upper surface of a flat substrate 1 such as glass to a predetermined thickness to uniformly form a first magnetic thin film 2. On the entire upper surface of the first magnetic film 2 is similarly deposited a good electrical conductor, such as copper, so as to form a uniform film 3 of conductive material. The entire structure thus comprises the substrate 1 on which the first magnetic thin film layer 2 and the conductive film layer 3 are successively integrated, layers 2 and 3 being "laminated" layers. On the upper surface of the conductive film layer 3 are formed by a well known method a predetermined number of anti-erosive strips 4 of photo-resist arranged with predetermined spacings, each of which has a width greater by a few to several microns than that of each strip line to which the conductive film 3 is to be reduced subsequently. Portions of the conductive film 3 upon which no photo-resist strip 4 is deposited and those underlying said portions, viz portions indicated at 10, are etched as shown by dotted lines in FIG. 1 by using an etchant of $FeCl_3$ capable of etching both the conductive film 3 and the first magnetic film 2 in the same operation. As a result of the etching treatment, integrated strips 5 are formed on the substrate 1, said strips 5 defining grooves 6 therebetween and being formed of a first magnetic film **2*a* and a conductive film 3*a* both having approximately the same width as the photo-resist strip 4**, as shown in FIG. 2.

Figure 3:
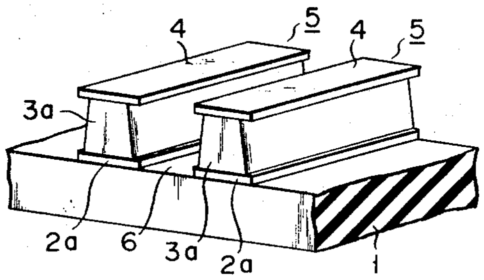
Figure 4:
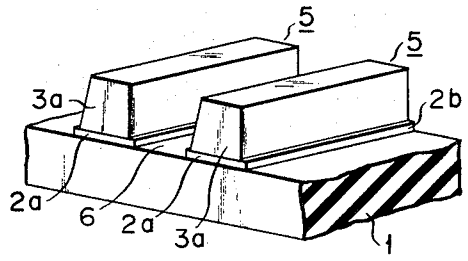

The integrated strips 5 on which the photo-resist strips are mounted are immersed in an etchant formed of a solution of ammonium persulfate $(NH_4)_2S_2O_8$, thereby to permit copper or the conductive film to be selectively etched and to have a smooth etched surface, without affecting the first magnetic film **2*a*. This selective etching is carried out with the density of $(NH_4)_2S_2O_8$ ranging from 20 to 30% and at a temperature of 20° to 70° C. As shown in FIG. 3, each conductive film 3*a*** is further eroded or etched at the side surfaces thereof, so that the sidewardly exposed ends *2b* of the first magnetic film *2a* remain projected sidewardly from the side surfaces of the conductive film *3a* by one to two microns. Thereafter, the photo-resist strips 4 may be removed as shown in FIG. 4 by means of a well known process.

Figure 5:
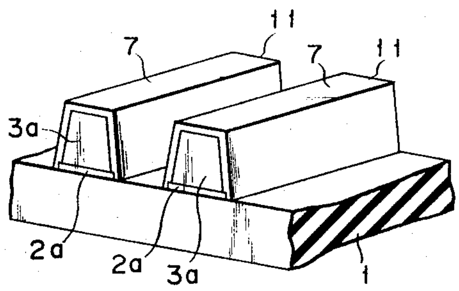

As shown in FIG. 5, second magnetic thin films 7 of permalloy are vapor deposited or electroplated on the sides and upper surfaces of the integrated strips 5, with the result that a magnetic thin film memory is produced which comprises the substrate 1 and hollow memory elements 11 formed on the substrate and in which the electrical conductors *3a* are penetrated, said memory elements 11 including a closed flux path formed by the first and second magnetic thin films *2a* and 7.

According to the method of this invention, the good electrical conductive material may be formed on the first magnetic thin film 2 either by vapor deposition or electroplating. In either case, good magnetic coupling can be obtained between the first and second magnetic thin films owing to the projections *2b* formed on the first film by selective etching, and flat and smooth etched surfaces (vertical surfaces) may be obtained. For the purpose of attaining these advantages, it is important that the density of ammonium persulfate serving as the selective etchant is selected in the form of a 20–30% solution thereof, and the temperature for selective etching is determined within the range of 20° to 70° C.

Although not illustrated, the method of the invention may be modified as follows. A magnetic thin film may be deposited on the entire surface of a flat substrate. On the magnetic thin film are deposited photo-resist strips each having a width a few microns greater than that of a portion of the conductive film which should remain as a strip line in the subsequent process. The photo-resist is removed after the etching treatment. On the surface of the first magnetic film is electroplated copper serving as a good conductor, which is then immersed in a 20–30% solution of ammonium persulfate, with the result that the first magnetic film is projected sidewardly from the copper strip line by 1–2 microns. Thereafter a second magnetic thin film may be formed in a similar manner, such as by electroplating to obtain a memory element of a predetermined configuration.

In the foregoing embodiment, copper is used as the conductive strips covered by the magnetic thin films *2a* and 7. It is possible to use other good electrical conductors, such as gold or silver. Since gold and silver have less adhesive power to a magnetic material, such as permalloy, it is necessary to first deposit titanium on the first magnetic film to a thickness of 100 to 200 angstroms, and thereafter gold or silver may be deposited on the titanium layer. Gold or silver may be selectively etched by an etchant formed of a mixture of a solution prepared by dissolving iodine in water in the ratio, for example, 50 g. to 500 cc. and a solution prepared by dissolving potassium iodide in water in the ratio, for example 50 g. to 500 cc. The titanium layer which is not affected by said etchant may be suitably selectively etched by hydrofluoric acid.

Figure 6:
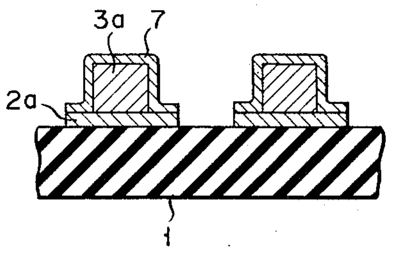
FIG. 6 shows a modification of the memory element prepared by the method of the invention.
Figures 7, 8, 9, 10:
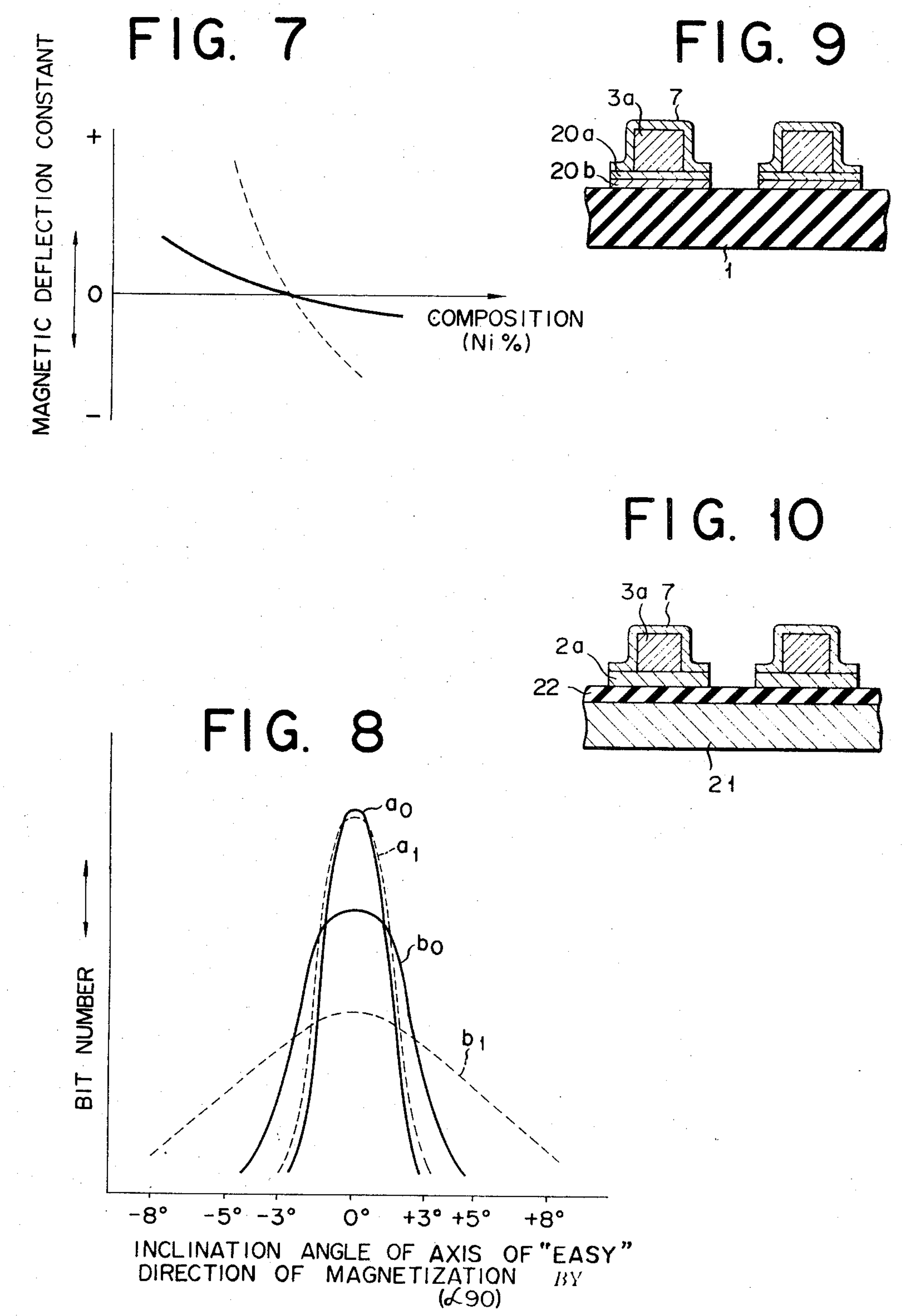
FIG. 7 is a graph showing the relationship between the magnetostriction constant of a magnetic material used in the memory element shown in FIG. 6 and the ratio of the composition thereof.
FIG. 8 is a graph showing the relationship between the angle of inclination of the easy direction of the magnetic material and the number of bits.
FIGS. 9 and 10 illustrate further modifications of the magnetic thin film memory element prepared according to the method of the invention.

All of the magnetic thin films may be formed of a material having a less coercive force, such as permally, or a material having a larger coercive force, such as a Ni-Co alloy. Alternatively, the first magnetic films *2a* may be formed of a Ni-Co-Fe alloy and the second magnetic films may be formed of permalloy which produces a less anisotropy field than said Ni-Co-Fe alloy, as shown in FIG. 6, to provide a memory element capable of nondestructively read-out. The formation of the first magnetic films *2a* by the Ni-Co-Fe alloy provides magnetic film elements of high quality having excellent magnetic properties. More particularly, a variation in the magnetostriction constant of the alloy with respect to a variation of the composition, as shown in a solid line in FIG. 7 is small as compared with that of a Ni-Fe alloy as shown in a broken line, so that the magnetic film formed has a small magnetostriction constant and is stable. Further, the dispersion of the easy direction of the magnetization of the Ni-Co-Fe film *2a* which is shown in a solid line $a_0$ in FIG. 8 is very small when compared with that of the film formed of the Ni-Fe film shown in a solid line $b_0$ in the same figure. In addition, when a stress is applied, the dispersion of the easy direction of the Ni-Fe film which is shown in a broken line $b_1$ is considerably increased, while the same does not mostly change in the case of the Ni-Co-Fe films as shown in a broken line $a_1$. Thus, when the first magnetic film *2a* is formed of the Ni-Co-Fe alloy, the dispersion of the easy direction is very small and the quality of the memory element can be greatly improved as compared with the first film formed of the Ni-Fe alloy as is well known. Use of the Ni-Fe alloy for the second magnetic film will not cause increasing the dispersion of the easy direction, since such overlying film is not subjected to stress.

Since both ends of the Ni-Co-Fe strip *2a* do not engage the copper film *3a* and hence are not applied with any additional force, no distortion occurs in the strip *2a* and the easy direction may be established in agreement with the axial direction of the strip. Further, the easy direction at the central part of the Ni-Co-Fe strip *2a* is pulled by the magnetic domain and agrees with the axial direction of the strip. Especially when the easy direction is in agreement with the axial direction of the strip, it is orderly arranged in the axial direction of the strip as a whole due to a diamagnetic field effect. This phenomenon is more conspicuous the thinner is the magnetic strip.

According to the above described embodiment, it is possible to provide a less expensive magnetic thin film element in which, owing to the provisions of the magnetic thin films of high density, the magnetic property is stable, disorderly arrangement of the easy direction can be avoided and separation or peeling off of the various films can be avoided.

The device shown in FIG. 6 comprises the first magnetic thin film of Ni-Co-Fe, as described. As shown in FIG. 9, the first magnetic thin film may include two layers *20a* and *20b*. The layer *20a* is formed of the same material as the second film 7 and the layer *20b* is made of a material having a greater magnetic anisotropy than that of the material forming the layer *20a*, thereby making the device a nondestructive read-out device one.

FIG. 10 shows a modification in which the substrate 21 is made of a conductive material and a heat-resistant insulating film 22 made, for example, of polyimide resin, is deposited on the substrate. In the device of this arrangement, a magnetic flux produced by passing an electric current to conductive strips *3a* is concentrated on magnetic paths *2a* formed between the insulating film 22 and the conductive strips *3a*. The magnetic flux in the magnetic path *2a* has a density equivalent to that which would be obtained if a current having the same magnitude as that introduced through the conductive strip *3a* passed through the opposite side of said conductive strip *3a* with the insulating film 22 interposed between the magnetic path *2a* and the conductive substrate 21, and the magnetic flux produced by said current is concentrated to the magnetic path *2a*. This is known as a mirror image effect.

What we claim is:

1. A method for manufacturing an uniaxially anisotropic magnetic thin film memory element comprising the steps of:

depositing a first uniaxially anisotropic magnetic thin film layer on a flat substrate;

depositing a conductive film layer on said first magnetic thin film layer to form a laminated layer of said first magnetic thin film and conductive film layers;

photo-etching said laminated layer to form a plurality of equal with integrated strips comprised of said first magnetic thin film and conductive film strips, by depositing an etching mask on said conductive layer, and then etching said first magnetic thin film layer and said conductive film layer in the same operation by a first etchant;

etching said integrated strips with a second etchant capable of selectively etching only said conductive strip to reduce only side walls of said conductive film strips so that said conductive film strips have a smaller width than said first magnetic film strips, said first magnetic film strips extending from the side wall planes of said conductive film strips;

removing said etching mask; and covering said conductive strips with a second uniaxially anisotropic magnetic thin film and forming a closed flux path with said first magnetic thin film.

2. A method according to claim 1 wherein said first magnetic thin film is formed of Ni-Co-Fe alloy, and said second magnetic thin film is formed of Ni-Fe alloy.

3. A method according to claim 1 wherein said conductive film is formed of Cu, said first etchant is a solution of $FeCl_3$, and said second etchant is a 20–30% solution of $(NH_4)_2S_2O_8$ being heated at a temperature ranging from 20° to 70° C.

4. The methanol according to claim 1 wherein said step of depositing said conductive film layer comprises successively forming films of titanium and gold on said first magnetic thin film layer, and further comprising the steps of etching said gold film in a mixture of a solution prepared by dissolving iodine in water, and a solution prepared by dissolving potassium iodine in water, and thereafter etching said titanium film to a similar extent by hydrofluoric acid.

5. The method according to claim 1 wherein said step of depositing said conductive film comprises successively forming films of titanium and silver on said first magnetic thin film layer, and further comprising the steps of etching said silver film in a mixture of a solution prepared by dissolving iodine in water, and a solution prepared by dissolving potassium iodine in water, and thereafter etching said titanium film to a similar extent by hydrofluoric acid.

6. A method according to claim 1 wherein said step of depositing said conductive film layer comprises depositing first and second superposed conductive layers.

7. The method according to claim 1 comprising forming a substrate of a conductor and an insulating film deposited on said conductor, and then depositing said first magnetic thin film layer on said insulating film.

References Cited

UNITED STATES PATENTS

| | | | |
|---|---|---|---|
| 2,758,074 | 8/1956 | Black | 96—36.2 X |
| 3,375,503 | 3/1968 | Bertleson | 340—174 |
| 3,396,047 | 8/1968 | Prosen | 340—174 |
| 3,423,205 | 1/1969 | Skaggs et al. | 96—36.2 |
| 3,498,764 | 3/1970 | Van Khai | 340—174 |
| 3,554,821 | 1/1971 | Caulton | 156—3 |
| 3,555,365 | 1/1971 | Forlani et al. | 29—625 X |
| 3,489,656 | 1/1970 | Balde | 117—212 X |
| 3,666,635 | 5/1972 | Oshima et al. | 117—139 |

RALPH S. KENDALL, Primary Examiner

M. F. ESPOSITO, Assistant Examiner

U.S. Cl. X.R.

117—217, 239, 240; 156—3, 8, 17; 96—36.2